United States Patent Office 3,391,177
Patented July 2, 1968

3,391,177
PROCESS FOR THE PRODUCTION OF β-CARBOXY - ETHYL - SUBSTITUTED ORGANOPOLYSILOXANES
Hans Niederprum, Monheim, and Walter Simmler, Cologne-Mulheim, Germany, assignors to Farbenfabriken Bayer Aktiengesellschaft, Leverkusen, Germany, a corporation of Germany
No Drawing. Filed Mar. 24, 1965, Ser. No. 442,474
Claims priority, application Germany, Mar. 26, 1964, F 42,445
9 Claims. (Cl. 260—448.2)

The present invention relates to an effective and versatile process for the production of organopolysiloxanes of the general empirical formula

wherein $n$ is a whole or fractional number which is greater than one and at most equal to 3 and wherein at least one of the individual substituents R of the polysiloxane is a β-carboxyethyl radical linked to silicon and each of the other substituents R is a hydrocarbon radical, at least half of said other substituents R being methyl, the remaining thereof, if any, being phenyl or vinyl. Preferably the hydrocarbon radicals in these siloxanes are all methyl, or methyl and phenyl, or methyl and vinyl.

1,3 - di - (β-carboxyethyl)-tetramethyl-disiloxane of the formula

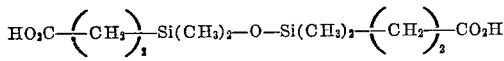

represents one of the simplest examples of these organopolysiloxanes, and several methods are known for its production. In this regard, it is possible to hydrolyze and condense β-carboxyethyl-trimethyl-silane with sulfuric acid whereby methane is formed, but the procedure is uneconomic since a Si-C bond formed with much trouble (for instance by a Grignard reaction) is decomposed again. It is also possible to prepare dimethyl-(β,β-dicarbethoxy-ethyl)-ethoxy-silane from dimethyl-(chloromethyl)-ethoxy-silane by a malonic ester synthesis and then to hydrolyze this product with acid. It is again possible to prepare pentamethyl-(β,β-dicarbethoxy-ethyl)-disiloxane from pentamethyl-(iodomethyl)-disiloxane by a malonic ester synthesis or to prepare pentamethyl-(β-carbethoxy-β-cyanoethyl)-disiloxane from such iodomethyl-disiloxane by a cyanoacetic acid ester synthesis and then to submit these disiloxanes to hydrolysis with acid whereby disproportionation occurs. In such case, however, half of the siloxane units are converted to hexamethyl-disiloxane which is inevitably formed as the side product.

Whereas these previously known processes for the production of a carboxyethyl-substituted disiloxane are not really satisfactory for commercial manufacture, the methods of production of higher polysiloxanes therefrom are even less suitable. Since the method known as "equilibration" otherwise in common use for the copolymerization of a disiloxane with other siloxanes fails in this case, a lactone being formed by the elimination of water, the only method known up to the present consists of the possibility of first converting di-(carboxyethyl)-tetramethyl-disiloxane to β-(dimethyl-chlorosilyl)-propionyl chloride and then hydrolyzing this product when mixed with other organochlorosilanes, for instance dimethyldichlorosilane.

It is an object of the present invention to overcome the foregoing disadvantages and to provide a particularly effective and versatile process for this production of organopolysiloxanes.

It is another object of the present invention to provide organopolysiloxanes of the instant type by a single step overall process.

It is a still further object of the present invention to provide such a process for producing organopolysiloxanes utilizing a β-organosilyl-α-cyanopropionic acid ester in admixture with one or more organochlorosilanes or one or more organosiloxanes in a strongly acidic aqueous medium until hydrolysis and co-condensation take place.

It is a still further object of the present invention to provide a process of the foregoing type for the production of organopolysiloxanes wherein hydrolysis, decarboxylation and co-condensation reactions indigenous to the process all proceed side by side during the single procedural operation.

It is a still further object of the present invention to provide such a process which reduces the overall reaction time and avoids cumbersome multiple step manipulations for achieving the desired end product.

It is a still further object of the present invention to provide a process of the foregoing type for producing such organopolysiloxanes which may be utilized effectively as surfactants, and plastics modifiers, etc.

Other and further objects of the present invention will become apparent from a study of the within specification and accompanying examples.

It has now been found in accordance with the present invention that a particularly effective and versatile single step overall process for the production of β-carboxyethyl-substituted organopolysiloxanes, as defined above, may now be provided which comprises heating a β-organosilyl-α-cyanopropionic acid ester of the general formula

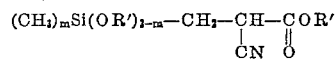

wherein $m$ is 1 or 2 and each of the substituents R′ is methyl or ethyl, in a strongly acidic aqueous medium in admixture with one or several organochlorosilanes of the general formula

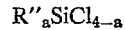

or one or several organosiloxanes of the empirical formula

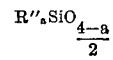

wherein $a$ is a number being at most equal to 3 and being in any case chosen so that the average of all numbers $a$ in the total sum of the organosilicon compounds present in the reaction mixture is greater than 1, and each substituent R″ is a silicon bonded hydrocarbon radical selected from the group consisting of methyl, phenyl, and vinyl, the proportion of phenyl or vinyl being chosen so that at least half of all the said hydrocarbon radicals R″ contained in the reaction mixture are methyl, until hydrolysis and co-condensation take place.

When the organosiloxanes

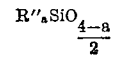

are employed as starting materials in accordance with the present invention, such as for example hexamethyl-disiloxane, hexamethyl-cyclo-trisiloxane, octamethyl-cyclotetrasiloxane and α,ω-bis-(trimethylsiloxy)-polydiorganosiloxanes, the hydrolysis operation is preferably carried out in a reaction medium consisting of a mixture of hydrochloric acid having 20 to 38 percent by weight HCl and concentrated acetic acid, the alkyl ester of acetic acid which is formed during this operation being continuously distilled off.

When the organochlorosilanes R″$_a$SiCl$_{4-a}$ are employed as starting materials in accordance with the present invention, for instance trimethyl-chlorosilane, dimethyl-dichlorosilane, methyl-trichlorosilane, methyl-phenyl-dichlorosilane or methyl-vinyl-dichlorosilane, it is preferred to employ acetic acid in a sufficient amount of water for hydrochloric acid having 20 to 38 percent by weight HCl to be formed when all Cl-Si bonds have been hydrolyzed.

As the artisan will appreciate, various inorganic acids may be used together with various organic acids to provide the strongly acidic aqueous medium for the required hydrolysis, decarboxylation and co-condensation reactions. However, as being the simplest and cheapest of those acids, hydrochloric acid and acetic acid are preferred.

Of especial advantage in accordance with the process of the present invention, is the fact that the various stages of reaction; i.e. the hydrolysis of the ester groups on the carbon atom and on the silicon atom and of the nitrile group, the decarboxylation, the hydrolysis of the chlorosilanes optionally employed at the same time, and the co-condensation of the siloxanes; all proceed side by side during a single operation. Accordingly, both prolonged reaction times and cumbersome multiple step manipulations are specifically avoided.

The β-organosilyl-α-cyanopropionic acid esters to be employed for the process of the present invention have also become readily available by a novel process for their production disclosed in our copending application Ser. No. 425,935, filed Jan. 15, 1965, when an alkyl ester of cyanoacetic acid is heated with an organo-bromomethyl-silane in the presence of a tertiary amine.

The carbofunctional organosiloxanes obtained according to the instant invention can be employed effectively, as the artisan will appreciate, as surfactants, for instance as emulsifiers, and for the modification of plastics, for instance of polyesters, siloxane elastomers or organopolysiloxane oils.

The following examples are given for the purpose of illustrating, while not limiting, the present invention.

Example 1

$$4C_2H_5O-Si(CH_3)_2-CH_2-CH-C-OC_2H_5 + 5\left(-Si(CH_3)_2-O-\right)_4 + 8CH_3CO_2H \rightarrow 4HCl + 6H_2O \rightarrow$$
$$\phantom{4C_2H_5O-Si(CH_3)_2-CH_2-}|\phantom{-}||$$
$$\phantom{4C_2H_5O-Si(CH_3)_2-CH_2-}CN\phantom{-}O$$

$$2HO_2C-CH_2-CH_2-\left(Si(CH_3)_2-O-\right)_{11}Si(CH_3)_2-CH_2-CH_2-CO_2H + 8CH_3CO_2C_2H_5 + 4CO_2 + 4NH_4Cl$$

183 g. (0.8 mole) of β-dimethyl-ethoxy-silyl)-α-cyanopropionic acid ethyl ester are mixed with 297 g. (1 mole) of octamethyl-cyclo-tetrasiloxane, 300 cc. of hydrochloric acid (38 percent by weight of HCl) and 300 cc. of glacial acetic acid and the mixture is heated to boiling under a fractionating column, so that the ethyl acetate formed during the reaction is continuously distilled off through such column. When no more ester distills, the excess of acid is for the most part evaporated off and the residue is then washed twice with a solution of 10 percent by weight of sodium chloride in water. The resultant oil is dried over sodium sulfate and then freed from volatile components by heating to 80° C. at 1 mm. Hg. The product has a refractive index of $n_D^{20}=1.4186$ and its viscosity amounts to 108 cst. at 20° C., its acid number being 112. Its absorption at 5.85µ in the infrared spectrum is due to the carboxyl group, but it has no absorption corresponding to an ester or nitrile group.

Example 2

$$3CH_3O-Si(CH_3)_2-CH_2-CH-C-OC_2H_5 + CH_3SiCl_3 + 15(CH_3)_2SiCl_2 + 3(CH_3)(C_6H_5)SiCl_2 + 6CH_3CO_2H + 24H_2O \rightarrow$$
$$\phantom{3CH_3O-Si(CH_3)_2-CH_2-}|\phantom{-}||$$
$$\phantom{3CH_3O-Si(CH_3)_2-CH_2-}CN\phantom{-}O$$

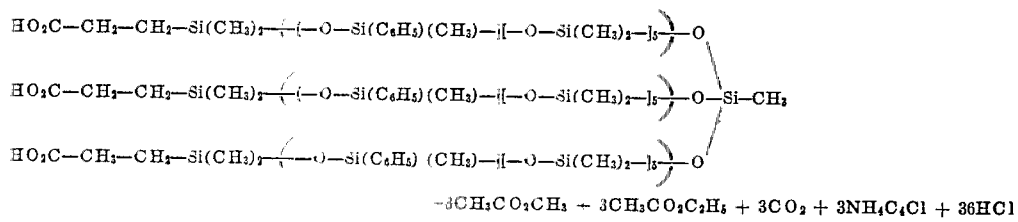

$$-3CH_3CO_2CH_3 + 3CH_3CO_2C_2H_5 + 3CO_2 + 3NH_4C_4Cl + 36HCl$$

645 g. (3 mole) of β-(dimethyl-methoxy-silyl)-α-cyanopropionic acid ethyl ester are mixed with 150 g. (1 mole) of methyl-trichlorosilane, 1935 g. (15 mole) of dimethyl-dichlorosilane and 573 g. (3 mole) of methyl-phenyl-dichlorosilane and the mixture is added dropwise with stirring in the course of 2 hours to a solution of 1 litre of glacial acetic acid in 2.5 litres of water. Then the mixture is heated to boiling under a fractionating column, so that the methyl acetate and the ethyl acetate formed during the reaction are continuously distilled off through such column. When no more ester distills, the residue is mixed with 2 litres of a saturated solution of sodium chloride; the oil phase is separated and then washed again with 1 litre of sodium chloride solution. The resultant oil is dried over sodium sulfate and then freed from volatile components by heating to 80° C. at 1 mm. Hg. After filtration 1650 g. (approximately 82 percent of the theoretical amount) of a yellowish oil are obtained, having a refractive index of $n_D^{20}=1.4248$. Its viscosity amounts to 180 cst. at 20° C. and its acid number is 88.

Example 3

Example 2 is repeated in an analogous manner, respectively, utilizing instead of methyl-phenyl-dichlorosilane 3 mole of methyl-vinyl-dichlorosilane, and upon hydrolysis, decarboxylation, co-condensation and distillation, the corresponding organopolysiloxane is obtained.

It will be appreciated, therefore, that the present invention covers a versatile and effective single step overall process for the production of organopolysiloxanes of the general empirical formula $$R_nSiO_{\frac{4-n}{2}}$$

in which $n$ is a number having a value greater than 1 and atmost equal to 3, at least one individual R substituent is β-carboxyethyl linked to silicon and each of the remaining R substituents respectively is a hydrocarbon radical selected from the group consisting of methyl, phenyl, and vinyl, which comprises heating a β-organosilyl-α-cyanopropionic acid ester of the formula $$(CH_3)_mSi(OR')_{3-m}-CH_2-CH-C-OR'$$
$$\phantom{(CH_3)_mSi(OR')_{3-m}-CH_2-}|\phantom{-}||$$
$$\phantom{(CH_3)_mSi(OR')_{3-m}-CH_2-}CN\phantom{-}O$$

in which $m$ is an integer having a value from 1 to 2, and each of the R' substituents is an alkyl radical having 1 to 2 carbon atoms, in a strong acidic aqueous medium in admixture with at least one organosilicon comopund selected from the group consisting of organochlorosilanes of the formula $R''_aSiCl_{4-a}$ and organosiloxanes of the empirical formula $$R''_aSiO_{\frac{4-a}{2}}$$

in which $a$ is a number having a value of at most 3 yet is chosen so that the average of all numbers $a$ in the total sum of the above defined organosilicon compounds present in the reaction mixture is greater than 1, and each R'' substituent respectively is a silicon bonded hydrocarbon radical selected from the group consisting of methyl, phenyl, and vinyl, at least half of the number of said hydrocarbon radicals contained in the reaction mixture being methyl, at boiling temperature, in general at from 80 to 100° C., until hydrolysis and co-condensation take place.

Accordingly, the various reaction stages, including the hydrolysis of the ester groups on the carbon atoms and on the silicon atoms and of the nitrile group or groups present, the decarboxylation, the hydrolysis of the chlorosilanes which may be employed, and the co-condensation of the siloxanes which may be employed, all proceed side by side during a single operation.

In accordance with a specific embodiment of the present invention, β-(dimethyl-ethoxy-silyl)-α-cyanopropionic acid ethyl ester is used with an organochlorosilane in the presence of acetic acid as reaction medium in a sufficient amount of water to produce hydrochloric acid upon hydrolysis of all Cl-Si bonds present.

In accordance with another specific embodiment of the present invention, the reaction is carried out with β-(dimethyl-ethoxy-silyl)-α-cyanopropionic acid ethyl ester and an organosiloxane free from Cl-Si groups in a mixture of glacial acetic acid and concentrated hydrochloric acid as reaction medium.

In accordance with a prefered feature of the invention, as used herein, both in the specification and claims, R' defines substituents which are all methyl, or all ethyl, or both methyl and ethyl; R" defines substituents which are all methyl, or both methyl and phenyl, or both methyl and vinyl; and one, two, or three of the R substituents define β-carboxyethyl radicals linked to separate silicon atoms while the remaining R substituents define substituents which are all methyl, both methyl and phenyl, or both methyl and vinyl.

It will be appreciated that the instant specification and examples are set forth by way of illustration, and not limitation, and that various modifications and changes may be made without departing from the spirit and scope of the present invention which is to be limited only by the scope of the appended claims.

What is claimed is:

1. Process for the production of organopolysiloxane of the general empirical formula

in which $n$ is a number having a value greater than 1 and at most equal to 3, at least one individual R substituent is β-carboxyethyl linked to silicon and each of the remaining R substituents respectively is a hydrocarbon radical selected from the group consisting of methyl, phenyl, and vinyl, which comprises heating a β-organosilyl-α-cyanopropionic ester of the formula

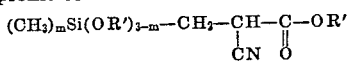

in which $m$ is an integer having a value from 1 to 2, and each of the R' substituents is an alkyl radical having 1 to 2 carbon atoms, in a strongly acidic aqueous medium in admixture with at least one organosilicon compound selected from the group consisting of organichlorosilanes of the formula

and organisiloxanes of the empirical formula

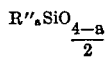

in which $a$ is a number having a value of at most 3 yet is chosen so that the average of all numbers $a$ in the total sum of the above defined organosilicon compounds present in the reaction mixture is greater than 1, and each R" substituent respectively is a silicon bonded hydrocarbon radical selected from the group consisting of methyl, phenyl, and vinyl, at least half of the number of said hydrocarbon radicals contained in the reaction mixture being methyl, at boiling temperature until hydrolysis decarboxylation, and co-condensation take place, and recovering the corresponding β-carboxyethyl-substituted organopolysiloxane thereby formed.

2. Process according to claim 1 wherein the β-organosilyl-α-cyano-propionic acid ester used is β-(dimethylethoxy-silyl)-α-cyano-propionic acid ethyl ester.

3. Process according to claim 1 wherein the β-organosilyl-α-cyano-propionic acid ester used is β-(dimethyl-methoxy-silyl)-α-cyano-propionic acid ethyl ester.

4. Process according to claim 1 wherein the reaction is carried out with an organochlorosilane, and acetic acid is used as reaction medium.

5. Process according to claim 1 wherein the reaction is carried out with an organosiloxane free from Cl-Si groups, and a mixture of glacial acetic acid and hydrochloric acid having 20 to 38 percent by weight HCl is used as reaction medium.

6. Process for the production of organopolysiloxane of the general empirical formula

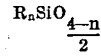

in which $n$ is a number having a value greater than 1 and at most equal to 3, at least one individual R substituent is β-carboxyethyl linked to silicon and all the remaining R substituents together include methyl and phenyl radicals, the number of phenyl radicals being at most equal to that of the methyl radicals, which comprises heating a β-organosilyl-α-cyanpropionic acid ester of the formula

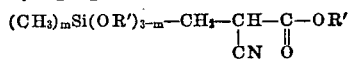

in which $m$ is an integer having a value from 1 to 2, and the R' substituents include at least one of methyl and ethyl, in a strongly acidic aqueous medium in admixture with at least one organosilicon compound selected from the group consisting of organochlorosilanes of the formula

and organosiloxanes of the empirical formula

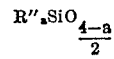

in which $a$ is a number having a value of at most 3 yet is chosen to that the average of all numbers $a$ in the total sum of the above defined organosilicon compounds present in the reaction mixture is greater than 1, and the R" substituents together include methyl and phenyl radicals, the proportions being chosen so that the number of phenyl radicals contained in the total reaction mixture is at most equal to that of the silicon bonded methyl radicals therein, at boiling temperature until hydrolysis, decarboxylation, and co-condensation take place and recovering the corresponding β-carboxyethyl-substituted organopolysiloxane thereby formed.

7. Process for the production of organopolysiloxane of the general empirical formula

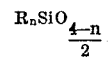

in which n is a number having a value greater than 1 and at most equal to 3, at least one individual R substituent is β-carboxyethyl linked to silicon and all the remaining R substituents together include methyl and vinyl radicals, the number of vinyl radicals being at most equal to that of the methyl radicals, which comprises heating a β-organosilyl-α-cyanprionic acid ester of the formula

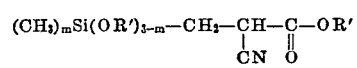

in which $m$ is an integer having a value from 1 to 2, and the R' substituents include at least one of methyl and ethyl, in a strongly acidic aqueous medium in admixture with at least one organosilicon compound selected from the group consisting of organochlorosilanes of the formula $$R''_a SiCl_{4-a}$$

and organosiloxanes of the empirical formula $$R''_a SiO_{\frac{4-a}{2}}$$

in which $a$ is a number having a value of at most 3 yet is chonse so that the average of all number $a$ in the total sum of the above defined organosilicon compounds present in the reaction mixture is greater than 1, and the $R''$ substituents together include methyl and vinyl radicals, the proportions being chosen so that the number of vinyl radicals contained in the total reaction mixture is at most equal to that of the silicon bonded methyl radicals therein, at boiling temperature until hydrolysis, decorboxylation, and co-condensation take place and recovering the corresponding β-carboxyethyl-substituted organopolysiloxane thereby formed.

8. Process which comprises heating β-(dimethyl-ethoxysilyl)-α-cyanopropionic acid ethyl ester with octamethylcyclo -tetrasiloxane in a mixture of concentrated aqueous hydrochloric acid and glacial acetic acid under reflux conditions until hydrolysis, decarboxylation and co-condensation take place, and recovering the corresponding β-carboxyethyl-substituted organopolysiloxane thereby formed.

9. Process according to claim 8, wherein 4 moles of said cyanopropionic acid ester and 5 moles of said cyclotetrasiloxane are used.

References Cited
UNITED STATES PATENTS

| | | | |
|---|---|---|---|
| 3,168,543 | 2/1965 | Black et al. | 260—448.2 |
| 3,182,076 | 5/1965 | Holdstock | 260—448.2 |
| 3,208,973 | 9/1965 | Bluestein | 260—448.2 XR |

TOBIAS E. LEVOW, *Primary Examiner.*

P. F. SHAVER, *Assistant Examiner.*

UNITED STATES PATENT OFFICE
CERTIFICATE OF CORRECTION

Patent No. 3,391,177                      July 2, 1968

Hans Niederprum et al.

It is certified that error appears in the above identified patent and that said Letters Patent are hereby corrected as shown below:

Column 1, line 69, "this" should read -- the --. Column 3, line 45, before "dimethyl" insert an opening parenthesis. Columns 3 and 4, in the formula at the bottom of the page, line 4 thereof, "-$CH_3$-" should read -- -$CH_2$- --; same formula, line 5 thereof, "$3NH_4C_4Cl$" should read -- $3NH_4Cl$ --. Column 7, line 11, "chonse" should read -- chosen --; line 18, "decorboxyla-" should read -- decarboxyla- --.

Signed and sealed this 30th day of December 1969.

(SEAL)

Attest:

Edward M. Fletcher, Jr.                      WILLIAM E. SCHUYLER, JR.
Attesting Officer                                       Commissioner of Patents